Figure 1:
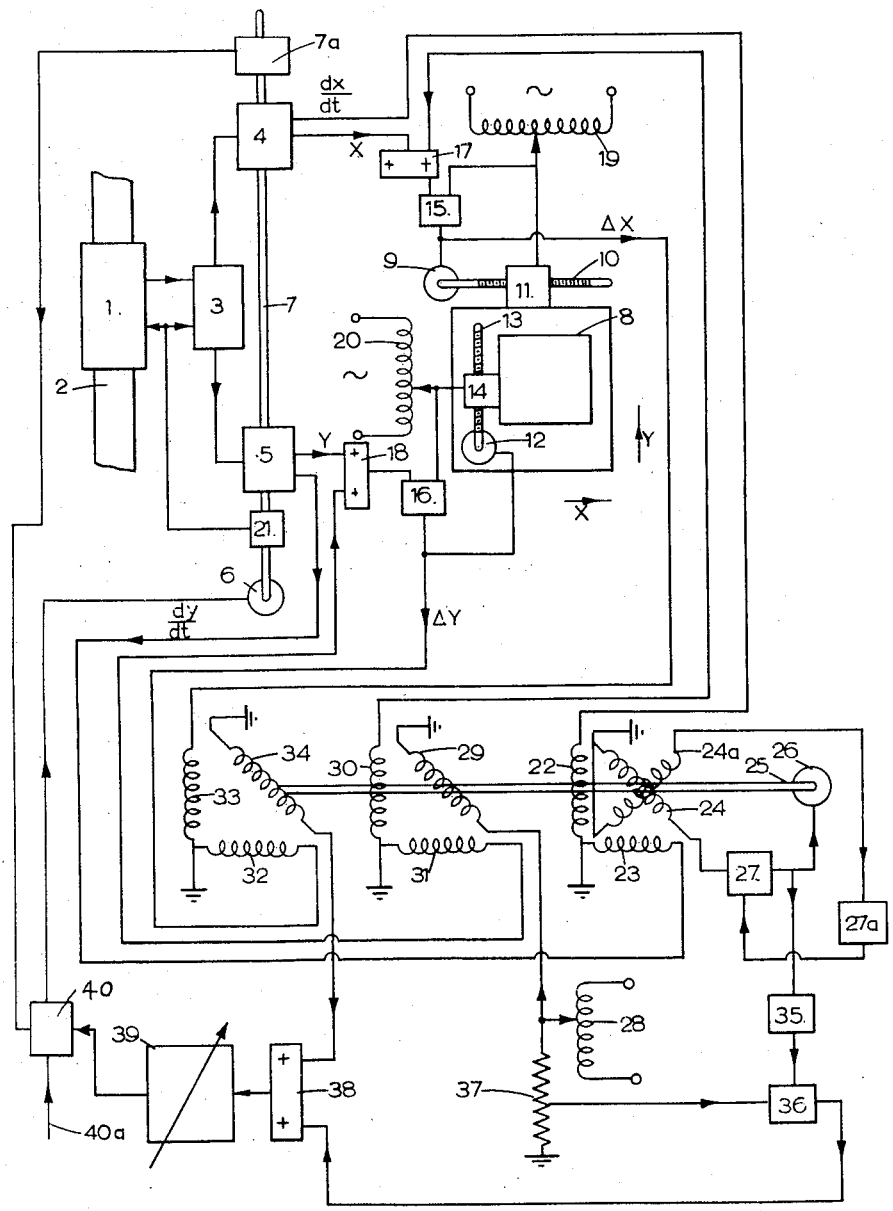

United States Patent Office 2,900,586
Patented Aug. 18, 1959

2,900,586
DISPLACEMENT ERROR REDUCING PATTERN SERVOSYSTEM

Rolf Edmund Spencer, West Ealing, and Roger Voles, Chiswick, London, England, assignors to Electric & Musical Industries Limited, Hayes, Middlesex, England, a company of Great Britain Application July 17, 1957, Serial No. 672,459

Claims priority, application Great Britain July 19, 1956

5 Claims. (Cl. 318—162)

This invention relates to servo mechanisms.

In a proposed form of automatic machine tool, information recorded in tape form and representing the co-ordinates of successive points on a workpiece is read off sequentially by a tape reader and employed in the derivation of the input or command signals for servo mechanisms. These servo mechanisms include servo motors which produce relative displacements in different co-ordinate directions between the cutting tool and the workpiece, the servo motors operating in response to error signals which are in effect the differences between displacements represented by the respective command signals and the actual displacements. However, the servo mechanisms are quite likely to include velocity and acceleration errors and in some circumstances these can produce errors in the contour which is actually cut. This can be true particularly of acceleration errors, since a velocity error which is truly linear and with the same time constant in each co-ordinate direction, only represents a displacement along the desired profile.

Similar difficulties may occur with other servo mechanisms which are controlled by signals derived from a record and representing a desired displacement.

The object of the present invention is to reduce the above-mentioned difficulties.

According to the present invention there is provided a servo mechanism comprising a servo-motor, means for deriving from a record variable signals representing desired displacements, means for comparing said signals with a signal representing displacement produced by said motor to provide a difference signal, said motor tending in response thereto to reduce said difference signal and control means responsive to said difference signal for controlling the rate of application of the signals derived from said record whereby errors in the displacement produced by said servo motor are maintained at less than a predetermined value.

In accordance with a preferred feature of the invention said control means is responsive only to a signal representing the component of the servo error which represents an error normal to the desired path since errors along the tangent to the desired path do not present any significant disadvantages, said means being effective to reduce the rate of application of signals when the "normal" component of the error exceeds a predetermined limit.

In the application of the invention to a machine tool, in which the signals derived from the record represent the co-ordinates of discrete reference points which define the desired path and in which a virtually continuous command signal is derived by interpolation among the signals derived from the record as described in United States application Serial No. 581,038 the rate of application of signals to a servo motor can conveniently be controlled by controlling the rate of operation of the interpolating means.

Figure 2:
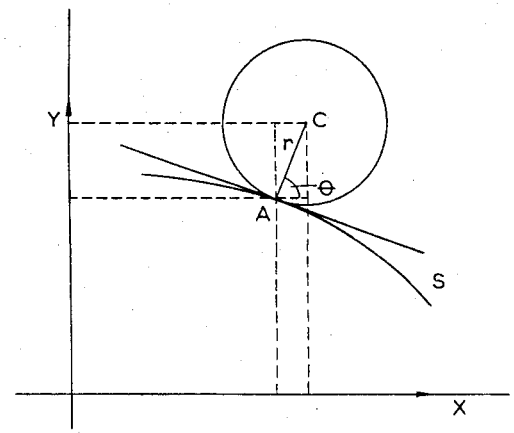
Figure 3:
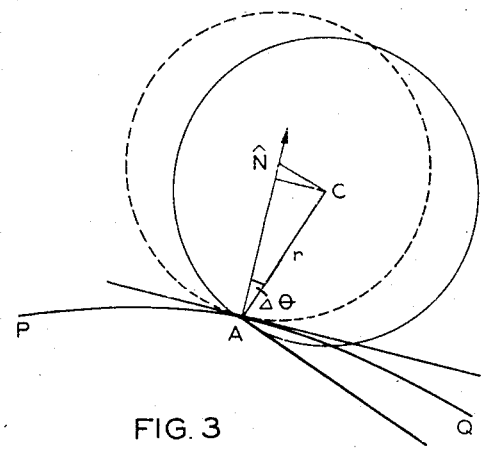
Figure 4:
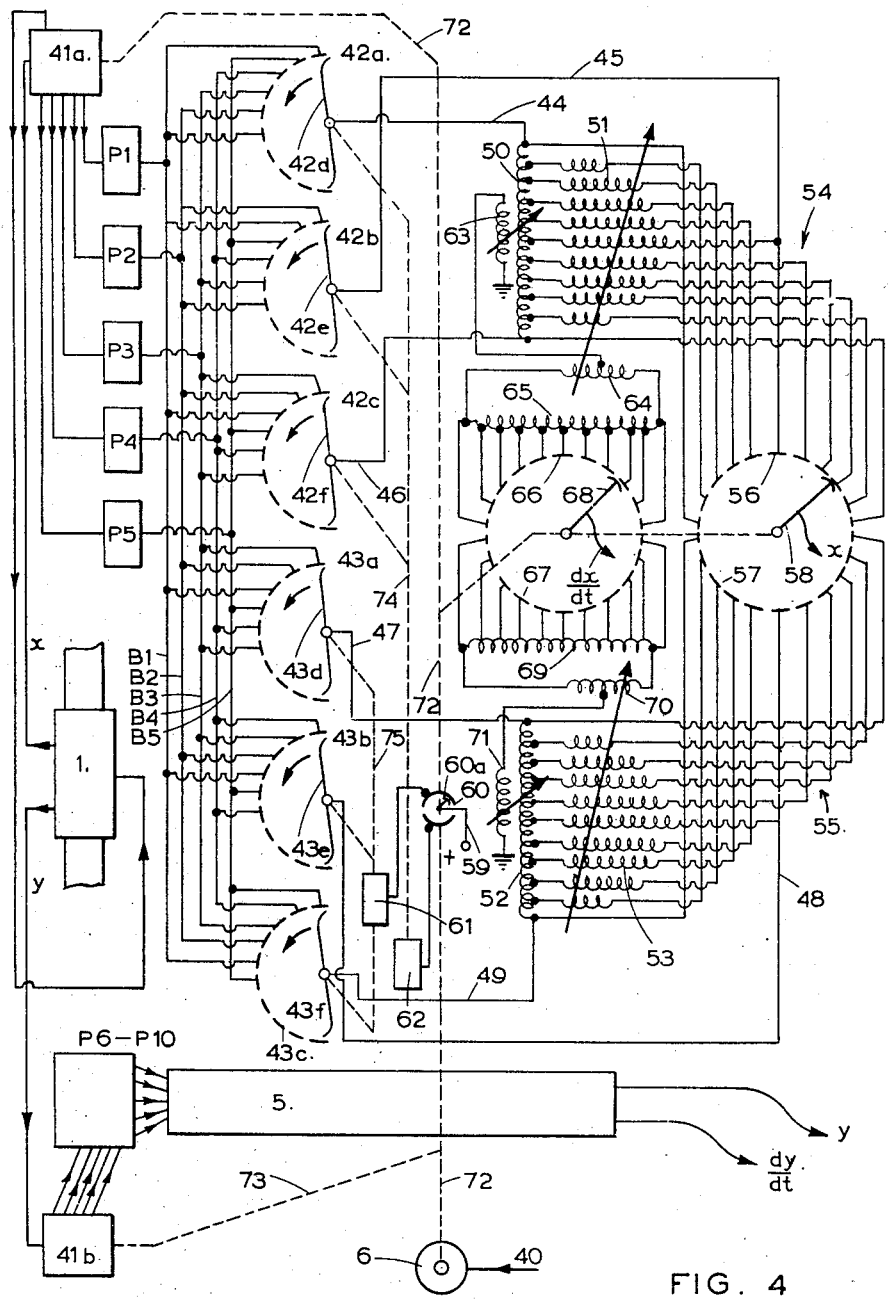

In order that the present invention may be clearly understood and readily carried into effect, the invention will now be described with reference to the accompanying drawings in which:

Figure 1 illustrates mainly in block form one example of an automatic machine tool incorporatnig the invention, Figure 2 and Figure 3 are geometrical diagrams referred to hereafter in the description of the operation of Figure 1, and Figure 4 illustrates in greater detail a section of Figure 1.

Referring to Figure 1 the record tape a fragment of which is denoted by reference 2 carries in binary code form corresponding values of co-ordinates $x$ and $y$ of successive reference points along a required contour for a workpiece. A tape reader 1 derives signals from 2 and such signals are communicated to a storage and programme unit 3, which feeds the X and Y parametric interpolators 4 and 5 respectively. The tape reader, storage and programme unit and interpolators will be described hereafter in greater detail with reference to Figure 4.

It will be assumed at present moreover that the interpolators 4 and 5 incorporate means, for deriving signals representing $dx/dT$ and $dy/dT$. The interpolators are driven by the servo motor 6 via a common shaft 7 a signal representing the speed of which is derived from the tacho-generator 7a. The rate of operation of the tape reader is synchronised with 7 for the purposes of Figure 1 by means of a timing unit 21. Reference 8 is the worktable of the automatic machine tool and it is driven in a system of cartesian co-ordinates in the $x$ direction by the servo motor 9 via the drive screw 10 and the nut 11, and driven in the $y$ direction by servo motor 12 via drive screw 13 and nut 14. The input signal to the amplifier 15 is the difference between a command signal derived from an adding circuit 17 and a position feedback signal derived in a usual manner from a potentiometer 19, and assuming that the command and feedback signals are amplitude modulated alternating signals, the amplifier 15 incorporates a phase sensitive rectifier of any suitable known form such as a pair of diodes for converting the input or error signal for the servo motor into a direct signal of either positive or negative polarity, depending on the sign of the error. Similarly the input signal to the amplifier 16 which also includes phase sensitive rectification means is the difference between a command signal derived from an adding circuit 18 and a position feedback signal derived from the potentiometer 20. The adding circuits 17 and 18 are fed by the interpolator with signals representing respective $x$ and $y$ co-ordinates of successive points on a required contour and are also supplied with additional signals which are discussed furthermore herein, necessary in correcting for the finite radius $r$, of the cutting tool.

The outputs $dx/dt$, $dy/dT$ from the interpolator are fed to the stator windings 22 and 23 respectively of a resolver whose rotor windings 24 and 24a are mounted in quadrature upon the shaft 25 of the servo motor 26 whose input signal is derived from 24 by the servo amplifier 27. The motor 26 therefore tends to set the shaft 25 to a position corresponding to the direction $\theta$ of the normal to the required workpiece profile. In the winding 24a is induced a signal which is proportional to the differential gain of this servo loop as explained in co-pending British application No. 18,720/56. This signal is fed to the block reference 27a which comprises means such as described in the above application for controlling the sensitivity of the servo mechanism comprising 24, 25, 26 and 27. A manually operated tapping on the potentiometer 28 which receives a reference alternating potential, provides a signal representing the said radius $r$ of the cutting tool and this is fed to the rotor winding 29 also mounted upon the shaft 25 of a second resolver whose stator windings 30 and 31 are connected so that the outputs therefrom are applied to 17 and 18 respectively. A third resolver also has its rotor 34 mounted on shaft 25 in the same sense as rotors 24 and 29. The stators 32 and 33 of the resolver are connected to receive outputs from the amplifiers 16 and 15 respectively at points prior to the rectifiers therein. The direct voltage output of 27 is communicated to a conventional squaring circuit represented by the block 35 whose output controls in known manner the gain of the amplifier 36 substantially linearly. The input of 36 is taken from a centre tapping on a potentiometer and its output is added by the adding circuit 38 to the signal generated in 34. The block reference 39 is a rectifying and limiting circuit which may be of suitable construction to pass a signal representing the modulus of its input when said input exceeds a predetermined magnitude which may be varied as required. For simplicity of understanding the operation of the circuit, it is assumed that block 39 comprises a variable biassed diode circuit of known form. The signals produced in 39, form an input to the servo power amplifier 40 and the output of 40 drives the motor 6 for the interpolator drive shaft 7. The input 40a of 40 can be preset to determine the "normal" speed of the motor 6.

In Figure 2 is shown a fragment of a required contour S, for a workpiece which is to be cut by the cutting tool, centre C and radius r. The normal vector AC has a slope of $\theta$ to the x-axis so that clearly, if the required contour S is to be produced when actual instructions for the machine represent points on S, corrections must be applied due to the finite radius of the cutter. Hence connections of $r \cos \theta$ and $r \sin \theta$ are as will be seen added by means of 30 and 31 to required successive values of x and y respectively to provide the command signals for the servo motors 9 and 12.

The tape reader 1 in response to successive codes on the tape 2 provides signals representing reference points on the required workpiece and 4 and 5 provide successive signals representing co-ordinates of sufficiently closely spaced points on the workpiece by interpolation between the coded reference points so that the input signals from 4 and 5 can be regarded as continuously variable signals. Further, as indicated and described hereafter, 4 and 5 provide for the stator windings 22 and 23, signals representing the rate of change of the respective co-ordinates. The servo loops comprising the resolver winding 24, the amplifier 27, motor 26 and shaft 25 therefore operate to equate $$-\frac{dx}{dt} \cos \theta \text{ and } \frac{dy}{dt} \sin \theta$$

so that 24 sets at an angle $\theta$ to within its own limits of error. The resolver winding 29 is thus also set to the angle $\theta$ and since it carries a signal representing r, the signals generated in 30 and 31 are analogues of $r \cos \theta$ and $r \sin \theta$. These signals are added as mentioned above in 17 and 18 to x and y respectively to provide the co-ordinate of successive positions of the cutter axis. The respective X and Y servo systems then operate quite conventionally so that motors 9 and 12 produce the required displacements of the worktable relative to the cutter.

Since the error signal $\Delta x$ which is tending to be reduced by servo motor 9 is fed also to the stator winding 33 and the error signal $\Delta y$ which is tending to be reduced by the servo motor 12 is fed to the stator winding 32 of a resolver, the rotor winding 34, since it is coupled to the shaft 25, provides a signal representing:

$$\Delta x \cos \theta + \Delta y \sin \theta$$

This expression is the resolved part of displacement errors in the direction of the normal to the contour of the workpiece at any instant and arises by virtue of the acceleration errors or by virtue of different time constants which cause different velocity lags in the servo mechanisms.

In a similar manner, an error $\Delta \theta$ due to the servo motor 26 exists and represents an uncertainty of the setting of 24 at an angle $\theta$. With reference to Figure 3, it is clear that a finite $\Delta \theta$ produces in effect a slight rocking of the cutter centre C about the point of contact A with the workpiece whose required profile in PAQ. Resolving the error into the direction of the normal N to the workpiece, the resolved error is:

$$r(1 - \cos \Delta \theta)$$

which to the second order of approximation is:

$$\tfrac{1}{2} r (\Delta \theta)^2$$

Returning to Figure 1, in the absence of 24a and 27a, the output of 27 is a function of the external parameter T and is proportional to $Sd\theta$ where S is a span length over which the parametric interpolators are operating but by virtue of 24a and 27a as aforementioned, the output of 27 is proportional to $\Delta \theta$ the error in $\theta$. The error signal $\Delta \theta$ is squared in a conventional manner in 35 and since the input of 36 is an analogue of $\tfrac{1}{2} r$ and the gain of 36 is controlled by signal representing $(\Delta \theta)^2$, the modulus of the output of 36 is analogous to $\tfrac{1}{2} r (\Delta \theta)^2$, the second order resolver error due to the servo motor 26. Alternatively, the direct signal $(\Delta \theta)^2$ may be used to modulate the alternating signal which represents $\tfrac{1}{2} r$ to provide a signal representing $\tfrac{1}{2} r (\Delta \theta)^2$. This signal is added in 38 to the above error derived by the resolver 34. Clearly a certain resolved error lies within the probable error which exists for the machine tool itself due to slight slackness on all moving parts and in particular to inaccuracies introduced where lead screws are employed, but any normally resolved errors exceeding this in magnitude are unacceptable when the machine is to be used to its full advantage. The output from the adding circuit 38 therefore is fed to the limiting circuit 39 which may be of known construction to take the modulus of the signal and according to a predetermined manual setting of tolerable resolved error, the output of 39 is compared with the signal produced by 7a in the amplifier 40 the output of which drives the interpolators via the motor 6. Clearly, any control effect by 40 on the motor 6 is such as to tend to cause 6 to run at a speed which is slower than its preset "normal" speed.

Having now described the principles and mode of operation of the invention in relation to a machine tool it is desirable to illustrate in greater detail as anticipated above, in what manner the rate of application of control signals to the servo mechanisms which produce displacements in the two co-ordinate directions for the machine, is controlled. Referring for this purpose to Figure 4, which illustrates an arrangement substantially similar in construction to that described in United States application, Serial No. 518,912, the tape reader 1 is again shown in block form for it may be of known construction and it is assumed for the purpose of the present explanation that it is of a type used in known teleprinter techniques. The information is punched on the tape in rows of perforations corresponding to binary digits and to read off a pair of co-ordinates therefore the reader is arranged to sequentially read off 10 characters or rows of perforations from the tape, to make up each value of a co-ordinate comprising 5 decimal characters. The tape reader of the type referred to moreover comprises an electro-mechanical clutch and a continuously running motor and reading is by operating the clutch whereas the motor operates the tape mechanism in step line manner. The electro-mechanical clutch is operated in response to signals provided by the programme unit 41 which for convenience is divided into two blocks 41a and 41b which are associated with the interpolators referred to as 4 and 5 respectively in Figure 1. The outputs from 1 correspond to values of x and y for successive reference points are fed via 41a and 41b to the sets of stores P1, P2 ... P5 and P6, P7 ... P10. The stores comprise switching devices which are operated in response to the output signals from the tape reader to select tappings on auto-trans- formers, thereby providing analogue voltages representative of the successive values of $x$ and $y$. Any suitable type of temporary storage device may however be used in operation of the present invention. Associated with the former set of stores is a group of bus-bars B1, B2, B3, B4 and B5 which are connected in a specified manner as illustrated to the fixed contacts of banks of two uniselectors in the one case comprising 42a, 42b and 42c and in the other case comprising 43a, 43b and 43c. Although they are not shown individually the stores P6 to P10 are included in a single block in the figure and are similarly associated with a set of bus-bars and a similar pair of uniselectors to the above and are included in the rectangle 5 together with a further set of interpolators. Since they are identical to the interpolators about to be described these interpolators are not illustrated in more detail. It is intended that the interpolators about to be described are those for interpolating between successive values of the $x$ co-ordinate for reference points derived from the tape reader 1. The uniselector contacts 42d, 42e and 42f are coupled to a single shaft 74 and are operated by the uniselector stepping device 62 which is of known construction and the movable contacts of the other uniselector namely 43d, 43e and 43f are coupled via the shaft 75 to the stepping device 61. All mechanical links shown in Figure 4 are indicated by dotted lines in order that they shall not be confused with electrical connections. Clearly these dotted lines in practise comprise shafts and gears which clearly need not be shown.

The $x$-interpolator comprises two units 54 and 55 which as will be seen, are arranged to operate alternately thus allowing for the reference signals on the five stores P1 to P5 to be changed, thereby obtaining a virtually continuous output. Considering 54, this interpolator comprises essentially a linear or chordal transformer winding 50 connected to which at equal intervals along it are a further set of transformer windings denoted by the general reference 51. The windings 51 have numbers of turns which are quadratically related to the position of connection along the winding 50 and the windings 51 are moreover all wound on a common core whereas 50 is wound on a separate core. The windings 51 are termed parabolic lift windings since the potentials which are developed across them represent points on a parabola having a chord which may be defined by the potential difference across 50 and these windings moreover are connected to fixed studs denoted by the general reference 56 mounted on a half stud circle which is scanned by a make-before-break contact 58. In the drawing there are 11 studs on the half circle but clearly in practice a greater number may be used if desired to correspond to a greater number of windings 51. The end studs of the half circle furthermore comprise half studs, the other halves comprising as will be seen by the end studs of a further half circle comprising studs denoted by the general reference 57 associated with the other interpolator 55. The interpolator 55 is virtually identical to the interpolator 54 in that it comprises a linear winding 52 and a set of parabolic lift windings 53 which are connected to the fixed studs 57 mentioned above of the other half of the stud circle which is scanned by the movable contact 58. The movable contact 42d of the uniselector 42 is coupled via the lead 44 to one terminal of 50 and the movable contact 42f of this uniselector is coupled to the other terminal of 50 by means of the lead 46. The movable contact 42e however of this uniselector is coupled to the upper end of the central parabolic lift winding of 51 via the lead 45 and which as mentioned above is connected to the central stud of group of studs 56. Similarly, the movable contact 43d of the other uniselector is coupled via the lead 47 to a terminal of 52 and the movable contact 43f is coupled via the lead 49, to the other terminal of 52 and the lead 48 connecting the movable contact 43e to the central parabolic lift winding of 53.

Coupled to the transformer winding 50 is a secondary winding 63 which is connected to the mid-point of a transformer winding 64 which in turn is inductively coupled to the parabolic lift winding 51 of the interpolator 54. The terminals of 64 are connected to an auto-transformer 65 which is tapped at equal intervals along its length and this tapping connected to contacts 66 of a semi-circle the end contacts again comprising half contacts. The number of tappings on the transformer 65 is chosen to equal the number of contacts on the half circle 56. In a similar manner inductively coupled with the transformer winding 52 is a secondary winding 71 which is connected to the mid point of a transformer winding 70 which is inductively coupled to the parabolic lift windings 53 of the interpolator 55. The terminals of 70 are connected to an auto-transformer 69 again being tapped at equal intervals along its length and these tappings being connected to contacts on a semi-circle 67 the end contacts of the semi-circle being half contacts and the semi-circles 66 and 67 comprising a complete circle which is scanned by a movable contact 68. Like 58, 68 is of the make-before-break variety. The movable contacts 58 and 68 are mounted on the same shaft which is mechanically coupled to the shaft 72 driven by the servo motor 6 which was previously indicated in Figure 1. Also mounted on 72 is a small commutator 60a making contact with a pair of commutator leaves 60 which are connected to the stepping mechanism 61 and 62 for the uniselectors. The contact 60a is connected to the terminal 59 which receives a positive potential so that 61 and 62 are energised alternately each uniselector is stepped on one position for each revolution of the shaft 72. The programme units 41a and 41b are also operated by a mechanical linkage from the shaft 72 which may be regarded as a master shaft for the machine.

In operation of the section of the apparatus shown in Figure 4 it will be assumed that five reference signals are already stored in the stores P1, P2, P3, P4 and P5 and with the uniselectors in the positions shown it is clear that the stores P1, P2 and P3 are connected to the interpolator 54 and the stores P3, P4 and P5 are connected to the interpolator 55. The movable contact 58 of the interpolator 54 is driven by the motor 6 via the shaft 72 and operates to pickoff the studs 56, successive values of the $x$-co-ordinates along a parabolic curve defined by the three reference signals stored in P1, P2 and P3. On arriving at the half stud at the end of the semi-circle of studs 56 the contact 58 begins to scan the half circle of studs 57 and the interpolator then commences to interpolate between the signals stored in P3, P4 and P5. Whilst this takes place the contact 60a of the commutator 60 is moved round towards its alternative commutator leaf and makes contact with it after the interpolator contact 58 has traversed about one third of the span of studs 57, 62 is energised and the uniselector 42 is stepped on one position. By following the connections shown it is clear that the stores which are now connected to the interpolator 54 are P5, P1 and P2. Thus when the contact 58 comes to the end of the semi-circle 57 it will commence interpolation between signals stored on P5, P1 and P2 and clearly by operating in this manner transition from one interpolator to the other takes place about a particular store, in this case the store P5, so that virtually no discontinuity is experienced in the signal representing X at the moment of changeover. Evidently whilst interpolation is being effected amongst signals stored in three particular stores it is necessary that the signals on the previously employed two stores shall be changed and in order to achieve this, the mechanical coupling 72 operates banks of a uniselector in the programme unit 41a. These uniselectors are connected in an analogous manner to the uniselectors 42 and 43 to the stores P1, P2 . . . P5 and are therefore not shown. The uniselector in 41a moreover is operative to provide read out signals for the tape reader 1. Thus when a pair of stores such as P1, P2 for example are disconnected from the interpolator the programme unit 41 causes signals to be applied to 1 to cause 20 rows of perforations to be read off the tape, these rows of perforations corresponding to four sets of five lines that is two co-ordinates of reference points on the required profile. Although not mentioned above, in addition to driving 4, the shaft 72 also serves to drive the interpolators denoted by the rectangle 5 operating on the y-co-ordinates of reference points on the desired profile for the workpiece and a similar mechanical connection 73 is made to the section 41b of the programme unit for these interpolators and the stores P6, P7 . . . P10.

Since the x and y co-ordinates of reference points are dealt with independently with respect to the rotation of the shaft 72 the rotation of 72 may be regarded as an independent parameter of time $t$ and this type of interpolation is known as parametric interpolation. Parametric interpolation is moreover described in greater detail in United States application Serial No. 581,038.

The additional transformer windings 63 and 64 coupled to the interpolator 54 and the corresponding additional windings 70 and 71 associated with the interpolator 55 are effective to provide signals representing the time differentials corresponding to successive values of $x$ provided by the interpolator. The signal induced across the transformer winding 63 is proportional to the chordal voltage for the interpolator 54 and the potential developed across the winding 64 is proportional to the parabolic lift on this interpolator. The theory of this device is described in greater detail in United States application Serial No. 627,614 and will not be further described herein, but clearly if the connections to the contacts 66 are made directly to interpolators along the transformer winding 64, the autotransformer 65 is not required. Since the movable contact 68 is mounted on the same shaft as 58 the values of $$\frac{dx}{dt}$$

derived from 68 are those which correspond to the appropriate values of $x$ derived from 58 and these are applied in the manner shown in Figure 1 to operate the present invention. Corresponding values of $y$ and $$\frac{dy}{dt}$$

are derived in an identical manner from the interpolator 5 and are also applied to the servo mechanisms as shown in Figure 1.

Since as described with reference to Figure 1 the output from 40 is varied according to the resolved part of the error in the direction of the normal to the workpiece and the speed of 72 is varied according to the velocity of the motor 6, clearly the rate of operation of the movable contacts 58, 68 and the associated switching mechanism comprising the uniselectors 42 and 43 of the interpolator 4 and also the associated uniselectors in the interpolator 5 and in turn the frequency of stepping of the uniselectors in the programme unit 41a and programme unit 41b are correspondingly varied in consequence of which the timing for the read out from the output reader is also varied to tend to keep the resolved error below a certain value.

Clearly, since the outputs from the sections 54 and 55 of the $x$ interpolator 4 are derived from successive contacts on a stud circle it is clear that the output will vary in discrete steps and although it is not illustrated in the present description it may be desirable to provide means for reducing the granularity of the output in a suitable manner for example by what is known as linear sub-interpolation. One example of linear sub-interpolation is described in United States application Serial No. 459,814 in addition, variable linear transformers may be employed to smooth the variable output. A corresponding reduction of granularity may be employed for the variable output of the Y-interpolator 5 and also on the corresponding signals representing $$\frac{dx}{dt} \text{ and } \frac{dy}{dt}$$

Although the above description of the present invention assumes that parametric interpolation is used the invention does not lie in the type of interpolator employed and obviously other types may be used. For example, a simpler interpolator such as described in the above mentioned United States application Serial No. 459,814 may be used. In this type of interpolation, interpolation is only required say amongst values of one co-ordinate over equal intervals of the other co-ordinate.

The invention can moreover also be applied to control mechanisms employing servo mechanisms producing displacements in three co-ordinate directions, in which case, similar compensation can be made for errors introduced by the servo mechanism employed in the means for compensating for the finite radius of a cutting tool.

By virtue of the invention, if the signal representing the modulus of the total errors is reduced by the servo motors in the machine tool and resolved into the direction of the normal to the direction of cut of the tool, exceeds a certain predetermined magnitude the rate of application of command signals to the servo motors is reduced until the excess error vanishes. In consequence an optimum rate of operation of the machine may always be employed whilst continuously maintaining the desired accuracy of cutting by the tool.

In the example illustrated variable gain amplifiers are used as multiplying devices, these can be sufficiently accurate for many purposes but more accurate multiplying devices may be substituted if desired.

Although moreover the present invention has been described herein with reference to a control mechanism for an automatic machine tool, the invention may be applied to other multidirectional control mechanisms and is clearly not limited to any one such application. Again, the invention is clearly not limited to use with control systems employing cartesian co-ordinates for by suitably modifying the arrangement any other system such as polar or cylindrical co-ordinates may well be employed, with suitable adjustments to the system.

What we claim is:

1. A servo mechanism comprising a servo-motor, means for deriving from a record signals representing successive desired displacements, means for interpolating among said signals to derive a continuously variable signal, means for comparing said continuously variable signal with a signal representing displacement produced by said motor to provide a difference signal, said motor tending in response thereto to reduce said difference signal and control means responsive to said difference signal for controlling the rate of application to said interpolating means of the signals derived from said record to maintain said difference signal below a predetermined value whereby errors in the displacement produced by said servo motor are maintained at less than a predetermined value.

2. A servo mechanism comprising a servo motor, means for deriving from a record a signal variable to represent desired displacements, means for comparing said signal with a signal representing displacement produced by said servo motor to provide a difference signal, said motor tending in response thereto to reduce said difference signal, means for producing displacement in a different direction from that produced by said servo motor and in timed relationship therewith, means for determining the normal to the resultant of said displacements with resolving means responsive thereto for deriving an error signal representing the component of error in said resultant in the direction of said normal, and control means responsive to said error signal for controlling the rate of application of the signals derived from said record to maintain said error signal below a predetermined value.

3. A mechanism according to claim 2, said means for producing displacement in a different direction comprising a second servo motor responsive to a second variable signal derived from said record.

4. A mechanism according to claim 2, said resolving means comprising means for deriving signals representing the velocities in both said directions, and a third servo motor operative in response to said signals representing velocities to set a shaft to a position corresponding to the direction of said normal.

5. A mechanism according to claim 4 comprising further resolving means for resolving a signal representing the radius of a cutter directed along said normal into signals representing radius components in the direction of first and second mentioned displacements, means for adding said signals representing radius components to the respective variable signals derived from a record, and wherein means are provided for deriving a further error signal representing the component of error in said resultant displacement in the direction of said normal arising due to an error in the setting of said shaft, said control means being responsive to both said error signals to maintain the sum of said error signals below a predetermined value.

References Cited in the file of this patent

UNITED STATES PATENTS 2,784,359    Kamm _____ Mar. 5, 1957

OTHER REFERENCES

Digital to Analogue Converters, Miller, Waddell, Patmore, Electronics, October 1952, pp. 127–129.